United States Patent [19]

Gruett

[11] Patent Number: 4,784,578
[45] Date of Patent: Nov. 15, 1988

[54] METERING DEVICE

[75] Inventor: Donald G. Gruett, Manitowoc, Wis.

[73] Assignee: Oil-Rite Corporation, Manitowoc, Wis.

[21] Appl. No.: 161,798

[22] Filed: Feb. 29, 1988

Related U.S. Application Data

[62] Division of Ser. No. 75,040, Jul. 17, 1987.

[51] Int. Cl.[4] ............................................. F04B 39/10
[52] U.S. Cl. ................................ 417/225; 417/443; 417/511; 417/570
[58] Field of Search ............... 417/225, 443, 511, 570, 417/514

[56] References Cited

U.S. PATENT DOCUMENTS

| | | | |
|---|---|---|---|
| 2,457,339 | 12/1948 | Bertea | 417/570 X |
| 2,605,021 | 7/1952 | Churchill et al. | 417/511 |
| 2,818,029 | 12/1957 | Petzold | 417/511 |
| 2,931,313 | 4/1960 | Hughes | 417/511 |
| 3,306,231 | 2/1967 | Cadiou | 417/511 |
| 3,930,756 | 1/1976 | Bruggeman | 417/511 |
| 4,436,494 | 3/1984 | Yamaizumi | 417/511 |

Primary Examiner—Leonard E. Smith
Attorney, Agent, or Firm—Andrus, Sceales, Starke & Sawall

[57] ABSTRACT

The metering device for a liquid medium comprises a cylinder and a piston operatively disposed therein to define a metering chamber ahead of the piston. The outlet end of the cylinder is open and closed by check valve means. The piston is driven forwardly through a working stroke to force the liquid medium in the metering chamber out of the chamber and past the check valve means. The piston breaks the plane of the open end of the cylinder on each working stroke to preclude entrapment of air in the metering chamber and thus provide for more accurate metering.

8 Claims, 1 Drawing Sheet

METERING DEVICE

This application is a division of my copending application Ser. No. 075,040, filed July 17, 1987.

BACKGROUND OF THE INVENTION

This invention relates to a metering device for the precision feeding of a liquid medium, even in relatively small or minute quantities.

Oil lubricants are among the many liquids which are at times metered. In a given instance, the feeding of too little oil may place a machine at risk. Too much oil may contaminate a product and contribute to pollution. Thus, accuracy in metering can be very important.

While accuracy in metering is generally desired, it is often difficult to attain. Air often gets into a feeding or metering system and becomes entrapped in the metering chamber. The entrapped air in the metering chamber will displace liquid medium in the measured quantity to render metering in minute quantities virtually impossible and in larger quantities inaccurate. It is generally an object of this invention to provide a metering device for a liquid medium wherein entrapment of air in the metering chamber is generally precluded to provide for more accurate metering even in minute quantities.

SUMMARY OF THE INVENTION

The invention resides in a metering device for a liquid medium and which comprises a housing having an inlet and an outlet for the liquid medium. A cylinder is disposed in the housing and has an open end that communicates with the housing outlet. Check valve means are provided in the housing and biased to close the open end of the cylinder. A piston is operatively disposed in the cylinder and forms therewith a metering chamber ahead of the piston. Means are provided to conduct the liquid medium from the inlet to the metering chamber. Means are further provided to drive the piston forwardly through a working stroke to force the liquid medium in the metering chamber out of the chamber and past the check valve means toward the housing outlet. The piston breaks the plane of the open end of the cylinder on each working stroke to generally preclude entrapment of air in the metering chamber and thus provide for more accurate metering of the liquid medium, even in minute quantities.

BRIEF DESCRIPTION OF THE DRAWING FIGURES

The drawings furnished herewith illustrate the best mode presently contemplated for the invention and are described hereinafter.

DESCRIPTION OF THE ILLUSTRATED EMBODIMENTS

Figure 1:
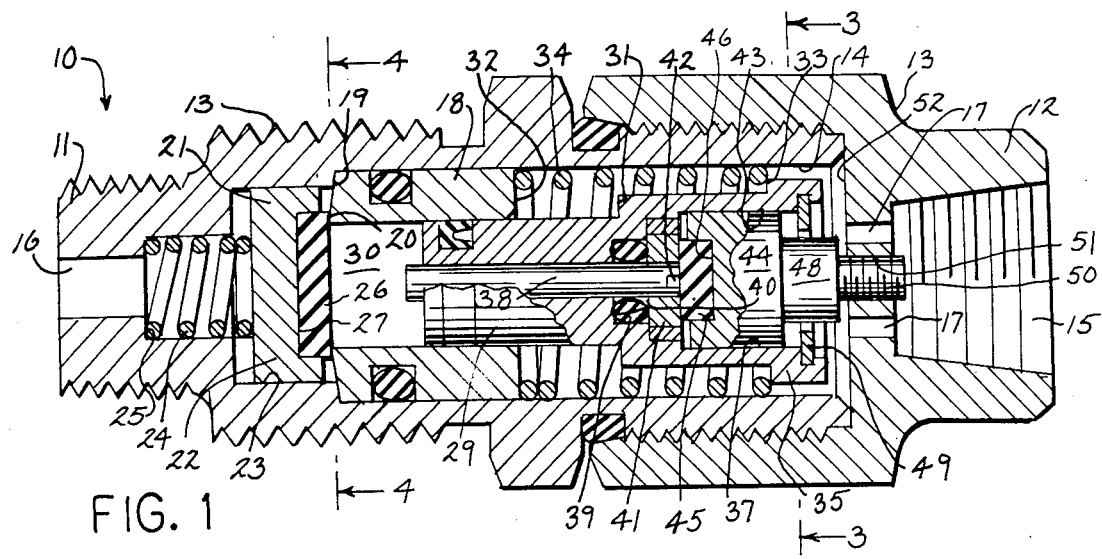
FIG. 1 is a sectional view through an hydraulic metering device according to this invention.

Referring initially to FIGS. 1-4 of the drawings, the hydraulic metering device 10 of this invention is intended to be disposed in a liquid medium supply line. A pump, not shown, delivers the liquid medium to the metering device 10 in pressure pulses for metered flow to a user assembly, not shown.

The metering device 10 generally comprises a pair of opposed hollow fittings 11 and 12 which are threadedly engaged to form the housing 13 having a stepped cylindrical chamber 14. The female fitting 12 is provided with an outlet 15 and the male fitting 11 with an outlet 16. As shown in the drawings, the inlet 15 and outlet 16 may be axially aligned with the chamber 14 and to each other. One or more openngs 17 place the fitting inlet 15 in communication with the chamber 14.

A cylindrical sleeve 18 is disposed in the chamber 14 generally adjacent to the outlet 16 and in abutting relation with the annular shoulder 19. The end of the sleeve 18 adjacent to the outlet 16 is tapered as viewed in section to provide a peripheral edge 20 that projects forwardly in the direction of the outlets at the inside diameter of the sleeve.

Figure 4:
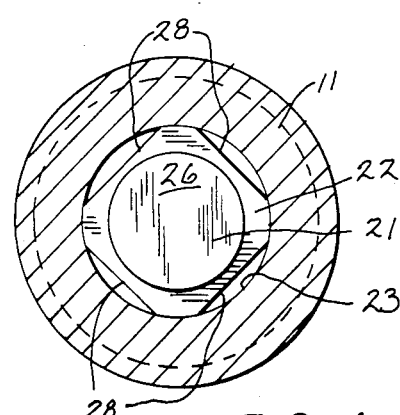
FIG. 4 is a sectional view taken generally along the line 4—4 in FIG. 1.

At the peripheral sleeve edge 20, a check valve member 21 provides closure for the end of sleeve 18. Valve member 21 comprises a carrier 22 which is axially slidable in the reduced diameter portion 23 of chamber 14 and is biased to the sleeve closure position shown in FIG. 1 by the coil spring 24 extending between the shoulder 25 adjacent to the outlet 16 and the carrier 22. Facing the sleeve 18 and generally centrally thereof the carrier 22 is provided with a cylindrical resilient sealing block 26. The sealing block 26 is seated in the carrier recess 27 and is engaged upon the sleeve edge 20 to effect closure of the sleeve end. The periphery of the carrier 22 is provided with one or more flats 28 as shown in FIG. 4, so that the interior of the cylinder sleeve 18 is placed in communication with the outlet 16 when the check valve member 21 is open.

Figure 2:
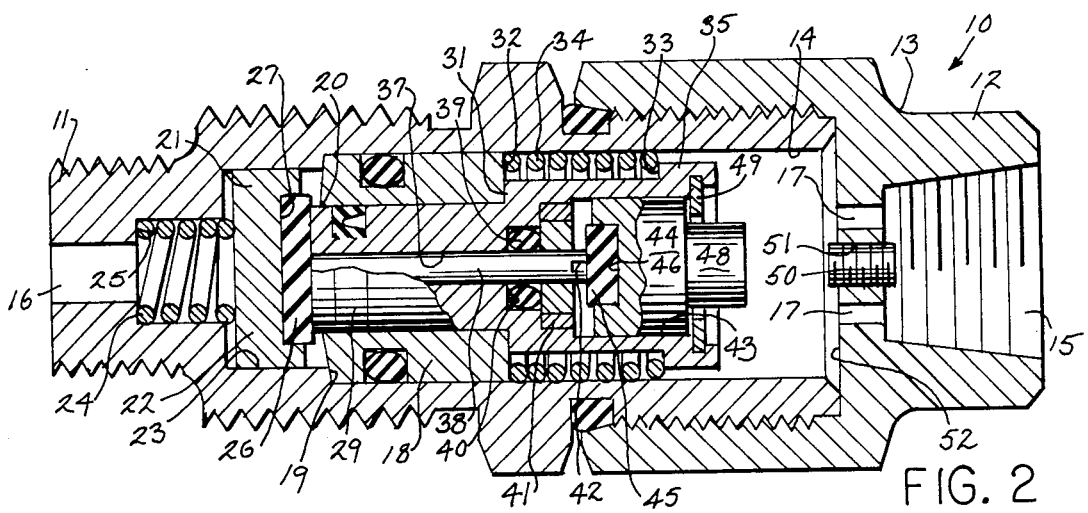
FIG. 2 is a sectional view similar to that of FIG. 1 and shows the metering device generally at the end of a pressure or working stroke.

A piston 29 is operatively disposed within the cylinder sleeve 18 and forms therewith the piston or metering chamber 30 as shown in FIG. 1 to be ahead of the piston. Externally the piston 29 is stepped providing intermediate its length the annular shoulder 31 which during the working stroke of the piston is engageable with the rear end 32 of sleeve 18 to terminate the working stroke. When the stop shoulder 31 engages with the end 32 of sleeve 18, the forward end of the piston 29 will have broken the plane of sleeve edge 20, as shown in FIG. 2, to completely void or purge the chamber 30.

Figure 3:
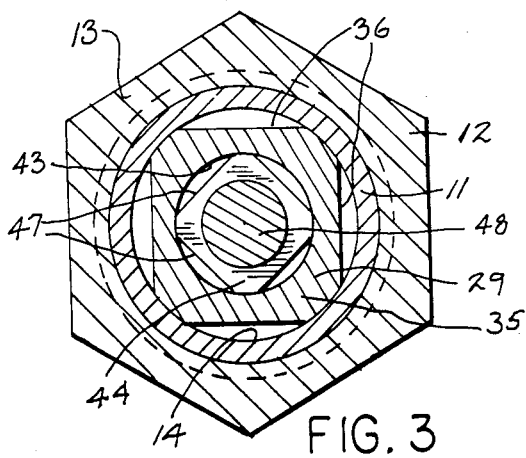
FIG. 3 is a sectional view taken generally along the line 3—3 in FIG. 1.

Adjacent to the rear end of the stepped piston 29, an annular shoulder 33 provides an abutment for the piston return coil spring 34 disposed between the shoulder 33 and the rear end 32 of sleeve 18. The end portion 35 of piston 29 rearwardly from the shoulder 33 is slidable along the cylindrical wall of chamber 14. As shown in FIG. 3, the piston end portion 35 is provided with one or more flats 36 so that pressure will be equalized on opposite sides of that piston portion.

The piston 29 is provided with an axially extending stepped bore 37 internally thereof to accommodate an axially slidable hollow tube or spool valve 38 therein adjacent to the forward end thereof. The spool valve 38 extends through an annular resilient friction lock and seal member 39 disposed intermediate the length of the piston 29 between the rearwardly facing annular shoulder 40 and the opposed annular securement member 41 threadedly engaged in the piston bore 37. The spool valve 38 extends through the securement member 41 and the rearward end thereof is provided with a recess opening 42.

Rearwardly from the securement member 41, the stepped piston bore 37 includes an enlarged bore portion 43 which opens toward the rear of the piston 29 and receives an axially slidable valve member 44. The forward face of the valve member 44 carries a projecting cylindrical resilient sealing block 45 mounted in the valve member recess 46. The sealing block 45 is in alignment with and engageable by the rear end of the spool valve 38. The sliding surface of valve member 44 is provided with one or more flats 47 to provide for the passage of liquid medium around the valve member as hereinafter further described. Rearwardly the valve member 44 is provided with a stem or projection 48 of reduced diameter. Adjacent to the rear end of the piston bore 37, a snap ring 49 is seated in the bore to keep the valve member 44 contained within the bore.

An adjusting set screw 50 is disposed in the threaded inlet hole 51 generally centrally of the inlet 15. When the screw 50 is fully retracted from the chamber 14, the projecting stem 48 of valve member 44 will have the capability of being biased against the rear housing wall 52 to provide for a piston chamber 30 of maximum length for maximum feeding of liquid medium with each working stroke of the piston 29. As the set screw 50 is turned to project inwardly from the wall 52, the piston chamber 30 will be correspondingly shortened and provide for corresponding feeding of liquid medium with each piston stroke. The amount of feeding by the metering device 10 is not only controlled by the size of the piston chamber 30, but also by the pulsing rate of the pump, not shown.

In the operation of the metering device 10 of FIGS. 1-4, a pressure pulse from an hydraulic pump, not shown, initiates a power or working stroke of the piston 29. Initially during the working stroke, the piston 29 along with the spool valve 38 in its closed, forwardly projecting position and the valve member 44 all move together as a unit. When the pressure in the piston chamber 30 exceeds the biasing force of the spring 24, the check valve 21 opens to allow the liquid medium content in the piston chamber to escape toward and through the outlet 16.

Toward the end of the working stroke of the piston 29, the leading end of the spool valve 38 initially engages with the check valve 21. After the forward progress of the spool valve 38 has been arrested, the piston 29 completes its working stroke by moving relative to the spool valve and valve member 44. At the end of the working stroke of the piston 29, the forward end of the piston and forward edge of the spool valve 38 will generally be in a common plane, as generally shown in FIG. 2, such that the opposed aft end of the spool valve will not project rearward beyond the securement member 41 to expose or open the spool valve recess 42 to the liquid medium in the chamber 14 behind the piston 29. Even while the spool valve recess 42 is being opened at the end of the working stroke of piston 29, passage of the liquid medium through the metering device 10 is blocked at this time by engagement of the check valve 21 on the opposite or forward end of the spool valve 38.

At the termination of the pressure pulse, the check valve 21 is biased to closure again by the spring 24 as the piston 29 together with the spool valve 38 and valve member 44 commence their return stroke in response to the biasing force of the spring 34. Initially as the piston 29 moves rearwardly on the return stroke, the spool valve 38 will remain aftward relative to the piston, being held in that position by the friction seal member 39. As a consequence the spool valve 38 is now able to serve as a conduit to conduct displaced liquid medium from chamber 14 behind the piston 29 to fill the piston chamber 30 during the return stroke. At the conclusion of the return stroke of piston 29, travel of the valve member 44 and the spool valve 38 are interrupted by engagement of the valve member 44 with the end wall 52 or adjusting screw 50. The piston 29 meanwhile continues aftward relative to the spool valve 38 to effect a reengagement between the securement member 41 and valve member 44 and thereby simultaneously effect a reclosure of the spool valve. The metering device 10 is then ready for the next cycle of operation.

According to the embodiment hereinbefore described, the invention provides for a more accurate metering device. Should any air get into a liquid medium supply system which includes the metering device of this invention, such air should create no problem. Since each working stroke of the piston breaks the plane of the open end of the cylinder, the metering chamber is completely voided or purged with each stroke leaving no air for entrapment to disturb the accuracy of the metering device. With the metering device of this invention, even minute quantities of liquid medium can be accurately metered.

Various modes of carrying out the invention are contemplated as being within the scope of the following claims particularly pointing out and distinctly claiming the subject matter regarded as the invention.

I claim:

1. In a metering device for a liquid medium a housing having an inlet and an outlet for the liquid medium, a cylinder in said housing and having an open end communicating with the housing outlet, check valve means in said housing and biased to close the open end of the cylinder, a piston operatively disposed in the cylinder and forming therewith a metering chamber ahead of the piston, means to conduct the liquid medium from the inlet to the metering chamber, and means to drive the piston forwardly through a working stroke to force the liquid medium in the metering chamber out of the chamber and past the check valve means forward the housing outlet, said piston breaking the plane of the open end of the cylinder to completely evacuate the metering chamber on each working stroke to generally preclude entrapment of air in the chamber and thus provide for more accurate metering of the liquid medium.

2. The structure as set forth in claim 1 wherein means are provided in the housing for effecting size adjustment of the metering chamber.

3. The structure as set forth in claim 1 wherein the open end of the cylinder as viewed in section is tapered to provide a forwardly projecting edge at the inside diameter of the cylinder.

4. The structure as set forth in claim 1 wherein the piston is hydraulically driven and the means to drive the piston forwardly through a working stroke is the liquid medium under pressure.

5. The structure as set forth in claim 4 wherein a spool valve extends axially through the piston and selectively conducts the liquid medium from behind the piston to the metering chamber.

6. The structure as set forth in claim 5 wherein the spool valve is opened to the rear of the piston at the end of the working stroke and spring means thereafter bias the piston rearwardly on the return stroke, said piston displacing the liquid medium behind the piston during the return stroke and forcing said displaced liquid medium forwardly through the open spool valve and into the metering chamber to fill the chamber in contemplation of the next working stroke.

7. The structure as set forth in claim 6 wherein the spool valve is closed at the end of the return stroke of the piston.

8. The structure as set forth in claim 1 wherein the piston is provided with an axially extending through bore placing the metering chamber in communication with a chamber behind the piston, said chamber behind the piston communicating with the liquid medium inlet.

* * * * *

UNITED STATES PATENT AND TRADEMARK OFFICE
CERTIFICATE OF CORRECTION

PATENT NO. : 4,784,578
DATED : November 15, 1988
INVENTOR(S) : Donald G. Gruett

It is certified that error appears in the above-identified patent and that said Letters Patent is hereby corrected as shown below:

Claim 1, line 43, delete "forward" and substitute therefor --toward--.

Signed and Sealed this

Seventeenth Day of October, 1989

Attest:

DONALD J. QUIGG

*Attesting Officer*  *Commissioner of Patents and Trademarks*